United States Patent [19]

Olds

[11] 4,357,771
[45] Nov. 9, 1982

[54] OPTICAL FILTER DEVICE

[75] Inventor: Howard F. Olds, Denver, Colo.

[73] Assignee: Mobius Communication, Inc., New York, N.Y.

[21] Appl. No.: 145,252

[22] Filed: Apr. 30, 1980

[51] Int. Cl.³ .................. H04N 5/72; H01J 61/40; G09F 13/00
[52] U.S. Cl. .................. 40/444; 40/579; 40/560; 353/75; 350/317; 350/319
[58] Field of Search ............ 40/444, 579, 560, 580; 353/75; 350/317, 318, 319

[56] References Cited

U.S. PATENT DOCUMENTS

| | | | |
|---|---|---|---|
| 1,791,994 | 2/1931 | Altenburg | 40/560 |
| 2,371,172 | 3/1945 | Hotchner | 40/560 |
| 2,398,799 | 4/1946 | Miller | 40/560 |
| 3,627,926 | 12/1971 | Nichols | 40/580 |
| 3,646,266 | 2/1972 | Hassell | 350/317 |
| 3,657,474 | 4/1972 | Turnrose | 353/75 |
| 3,867,630 | 2/1975 | Urban | 350/319 |
| 4,045,895 | 9/1977 | Work | 40/579 |
| 4,196,010 | 4/1980 | Sandhu | 350/317 |
| 4,246,713 | 1/1981 | Eckert | 40/579 |

Primary Examiner—Gene Mancene
Assistant Examiner—Michael J. Foycik, Jr.
Attorney, Agent, or Firm—Hubbell, Cohen, Stiefel & Gross

[57] ABSTRACT

An optical filter transforms defined color light images from television sets, projectors, and the like, into an endless variety of color abstracts. A plurality of light-collector channels conduct light from a color image to a translucent display screen, each channel diffusing and averaging light passing therethrough.

23 Claims, 18 Drawing Figures

U.S. Patent  Nov. 9, 1982  Sheet 1 of 2  4,357,771
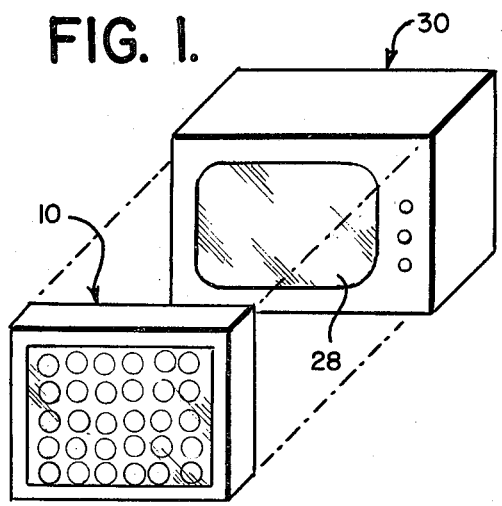
FIG. 1.
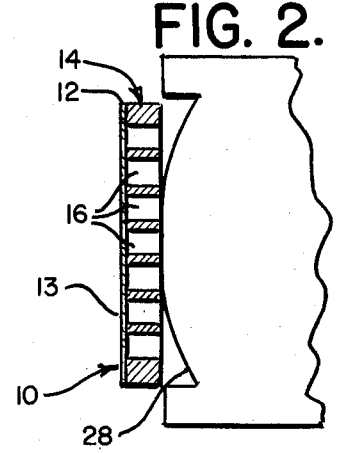
FIG. 2.
FIG. 3A.
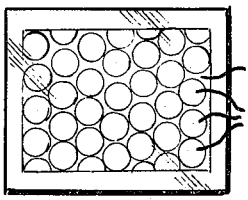
FIG. 3B.
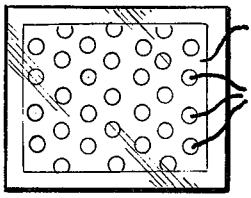
FIG. 3C.
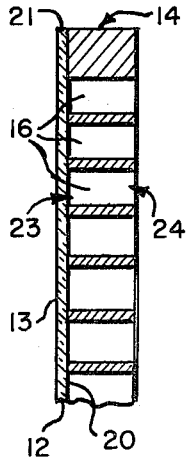
FIG. 4.
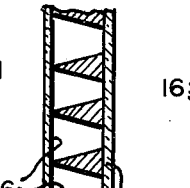
FIG. 5.
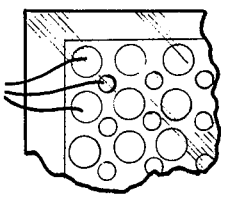
FIG. 6.
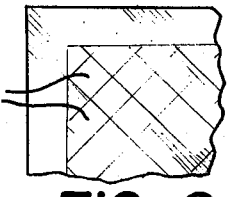
FIG. 7.
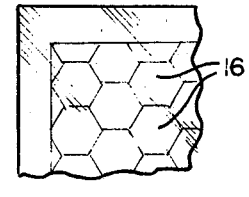
FIG. 8.
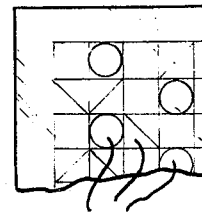
FIG. 9.
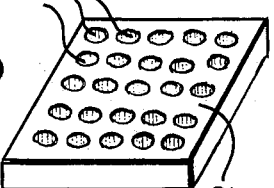
FIG. 10. FIG. 11. FIG. 12.
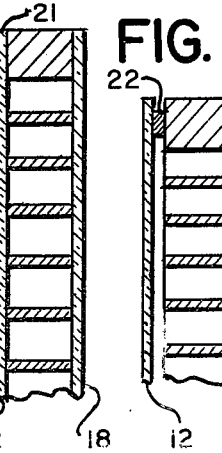

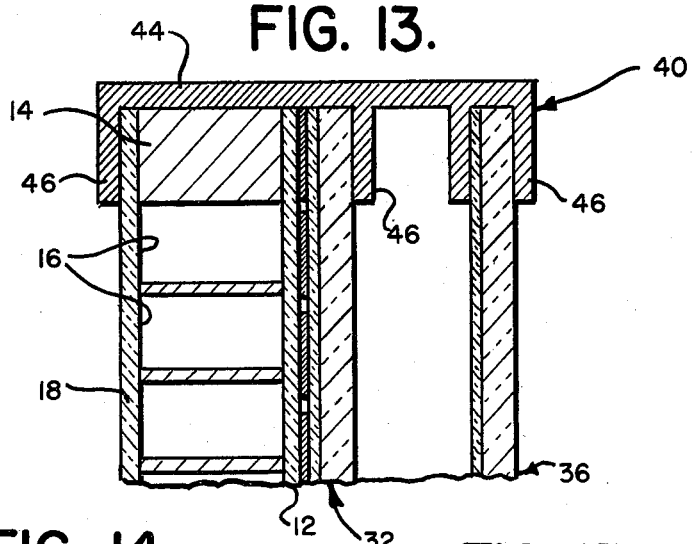
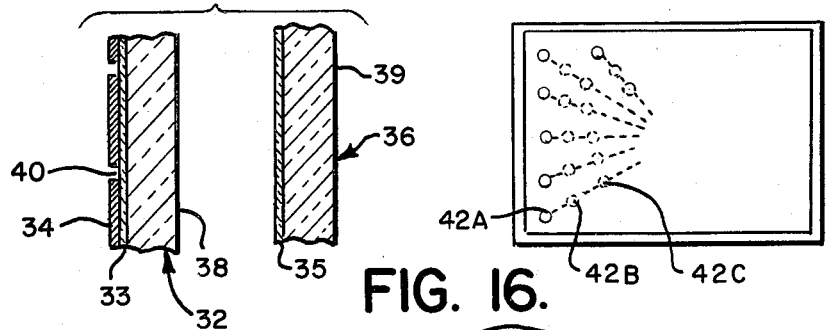
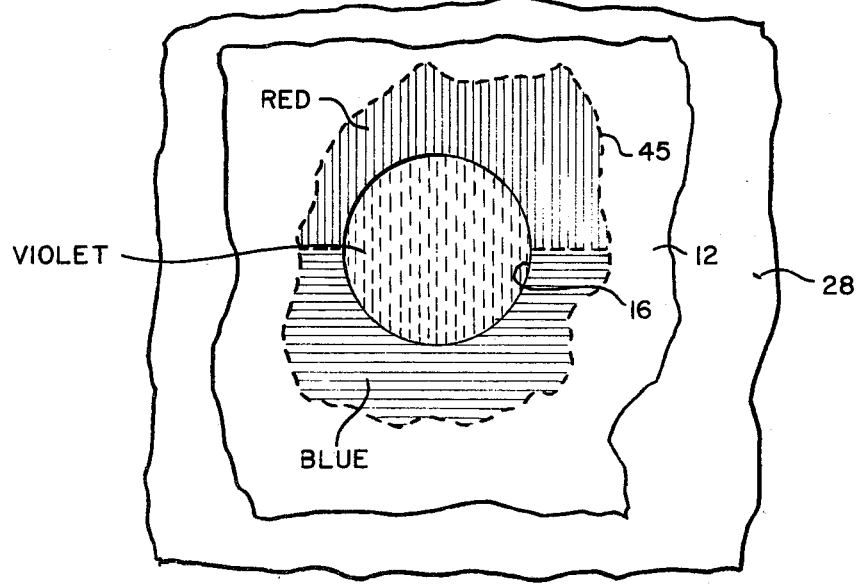

OPTICAL FILTER DEVICE

BACKGROUND OF THE INVENTION

1. Field of the Invention

This invention pertains to optical filters and more particularly to an optical filter which transforms defined color light images produced by television sets, motion picture projectors, slide projectors, and the like, into an endless variety of color abstracts.

2. Description of the Prior Art

Display devices, which produce illuminated color displays, are, of course, well known. Many of these display devices utilize a self-contained light source in combination with one or more rotating color wheels to produce a continuously changing color display. See, for example, U.S. Pat. No. 3,694,645 and U.S. Pat. No. 3,762,082. The color displays produced by such devices are, however, limited to the various color combinations produced by the rotating or movable color wheels. In addition, such devices are relatively costly to produce because of the variety of electrical parts including motors, switches, and the like, needed for their construction. Moreover, none of these prior art display devices known to applicant transforms a defined color image into one or more color abstracts.

In addition to the above prior art display device, there are display devices which produce color displays without the use of any self-contained light source or any movable parts. One such device is disclosed by U.S. Pat. No. 3,627,926 issued to Jordan. Specifically, Jordan discloses a design generator, which generates color designs of black and white moving pictures. The design generator comprises a stack of three aligned sheets. A pattern sheet has an opaque background with clear or transparent cut out portions. Two transparent colored sheets, which may also have cut out portions are aligned with the pattern sheet. The colors of the two sheets are selected so that both form a third distinct color. In operation the design generator is placed in a position to intercept light from a source or screen such as a television set or a motion picture projector. So intercepted, the intensity of the light passing through the cut out portion in the pattern sheet forms a flowing colored design and configuration when viewed through the design generator. While this design generator produces a colored display without the use of expensive electrical parts, the color display is limited to a variation of three separate colors resulting from the colored sheets and not from the image per se. Thus, even though the colored display is continuously changing, the variety of colors that can be displayed are limited. The overall effect is therefore not even as artistic as that produced by display devices which utilize movable color wheels. Furthermore, neither this device nor any of the other prior art display devices discussed above are capable of transforming color images, such as an image produced on a television screen, into a color abstract.

These disadvantages of the prior art are overcome by the present invention.

SUMMARY OF THE INVENTION

This invention is directed to an optical filter, which transforms defined color images produced by a light source, such as a television screen into a composite color abstract.

The principal structural components of the optical filter are a light-collector means comprising a preferably solid opaque body perforated with a plurality of light collector channels for diffusing and averaging colored light rays emitted from a defined color image, and a generally planar display screen disposed in a generally parallel confronting relation to the light-collector means. In operation, the optical filter is preferably disposed so that the light-collector channels are in a position to intercept multicolored light rays emitted from at least a portion of a defined color image, such as an image displayed on a television screen. When so intercepted the light rays are averaged and diffused as they pass through the plurality of light-collector channels. The diffused and averaged light rays exiting the light-collector channels impinge upon the rear surface of the display screen and are thereafter further diffused by the display screen so as to produce composite color abstracts which are each diffused color composites of the intercepted portion of the color image. When the defined color image intercepted by the optical filter is a moving image, the plurality of composite color abstracts displayed on the display screen will continuously change.

A different effect is accomplished by adding to the optical filter described above, a first partially silvered mirror, which forms the front or viewing surface of the device, and a second fully silvered mirror having at least one gap for the transmission of light positioned adjacent the display screen and behind and generally parallel to the first mirror. In operation, colored light transmitted through the gap or gaps in the fully silvered mirror results in successive reflections between the two mirrors, thereby creating a series of virtual images. The first reflection corresponds to the first virtual image, the second reflection corresponds to the second virtual image, etc. The multiple virtual images appear to extend back into the device so as to impart to the observer an illusion of depth. The observer is able to see these images by virtue of light transmitted through the partially silvered mirror which forms a front or viewing surface.

Further features of the apparatus according to the invention will become apparent from the following detailed description and annexed drawings, which disclose certain nonlimiting examples of the embodiment preferred at present.

BRIEF DESCRIPTION OF THE DRAWINGS

FIG. 1 is a perspective view of a display device embodying the present invention being used in connection with a television set;

FIG. 2 is a side view of the preferred display device being applied to a cathode-ray tube of a television set;

FIG. 3A is a front view of an alternative embodiment of the optical filter of FIG. 2 wherein the holes in the light-collector means are tapered;

FIG. 3B is a rear view of the optical filter depicted in FIG. 3A;

FIG. 3C is an exploded side view of the optical filter depicted in FIGS. 3A and 3B;

FIGS. 4, 5, 6, 7, and 8 are fragmentary front views of alternative embodiments of the display device of FIG. 1 showing different hole arrangements for the light-collector means; FIG. 9 is a perspective view of the light-collector means of FIG. 1;

FIG. 10 is a side view of the light-collector means depicted in FIG. 1;

FIG. 11 is a side view a light-collector means similar to FIG. 1 with the addition of an input screen;

FIG. 12 is a side view of another alternative embodiment of the optical filter of FIG. 1 showing the display screen in a spaced apart relation to the light-collector means;

FIG. 13 is a fragmentary side view of yet another alternative embodiment of the optical filter depicted in FIG. 1;

FIG. 14 is a fragmentary sectonal view showing a preferred construction for the mirrors employed in the embodiment of FIG. 13;

FIG. 15 is a front view of the display device depicted in FIG. 13.

FIG. 16 is an enlarged fragmentary front view of the display device of FIG. 1 applied to a television screen, diagramatically illustrating the transformation principle of the present invention.

DETAILED DESCRIPTION OF THE PREFERRED EMBODIMENTS

Referring now to the drawings in detail and initially to FIGS. 1, 2, 9 and 10 thereof, the preferred optical filter display device of the present invention, generally referred to by reference numeral 10, for transforming a defined color image into a composite color abstract is shown. As shown and preferred in FIGS. 1, 2, 9 and 10, the optical filter 10 preferably includes a display screen 12, such as for example, one manufactured of a translucent light diffusing material. As presently preferred display screen 12 is manufactured as a laminate of a clear plastic material, such as for example, an acrylate polymer and a translucent cellulose material, such as for example, tracing paper. While such a laminate can be manufactured by any suitable means known in the art, it is presently preferred to manufacture the laminate by adhesively bonding the two material layers together. Other translucent light-diffusing materials can, however, be used. Such materials include opal glass, case glass and various plastics in either rigid, semi-rigid or flexible form. Examples of suitable plastics include acrylic, styrene, cast lucite, polycarbonate, polyethylene, polystyrene and polypropylene. In order to further enhance the diffusion properties of the display screen 12, front surface 13 of the display screen 12 can be textural. Thus, the surface may have a repeating textured pattern, such as for example, of a diamond or prismatic shape. Alternatively, the front surface 13 of display screen 12 may be uneven with hemispherical protrusions extending outwardly from the front surface 13.

As shown and as presently preferred, display screen 12 has a rectangular peripheral geometric shape. However, it can be of any peripheral geometric shape such as circular, elliptical or triangular. Preferably, display screen 12 will have the same peripheral geometric shape as light-collector means 14 and is disposed in a generally parallel confronting relation to the light collector means 14 to which it is fixedly attached. Confronting relation is defined herein to include both in a spaced relation, such as illustrated on FIG. 12, and in an abutting relation, such as illustrated in FIGS. 2, 3C, 10 or 11, by way of example. Preferably, however, and, as best shown in FIGS. 2 and 10, rear surface 20 of display screen 12 is in abutting relation with front surface 21 of light collector means 14.

Numerous ways of fixedly attaching display screen 12 to light collector means 14 will be obvious to one skilled in the art and any may be used. As presently preferred, display screen 12 and light-collector means 14 are adhesively bonded together. Alternatively, an injection molding technique may be employed to integrally form the display screen 12 and the light-collector means 14. In still a further alternative mode of construction, the display screen 12 and the light-collector means 14 may be held together in a generally parallel confronting relation by means of a frame-like housing.

As shown and preferred in FIG. 9, light-collector means 14 comprises a solid rectangular body, which has been perforated so as to provide a plurality of light-collector channels 16, which, as will be described in greater detail hereinafter, diffuse and average light rays emitted from a defined color image so as to produce a plurality of composite color abstracts in cooperation with display screen 12. While light-collector means 14 may be constructed of any suitable material including cardboard, wood and metal, a lightweight material, such as for example, plastic or styrofoam is most desirable. As presently preferred an injection molding technique is employed to form the light-collector means 14. Such an injection molding technique can, if desired, be used to integrally form the light-collector means 14.

As best shown and preferred in FIGS. 1 and 9, the light-collector channels 16 are circular and arranged in a regular row and column pattern. It has been found that light-collector channels having a diameter of from about $\frac{1}{2}$ to about $1\frac{1}{2}$ inches produce the best results. A diameter of about one inch is, however, presently preferred. Like display screen 12, it is possible for light-collector means 14 to take any number of peripheral shapes, such as for example, circular, elliptical or triangular. However, the shape of the light-collector means 14 preferably corresponds to the peripheral shape of the display screen 12.

The length and width (the peripheral dimensions) of light-collector means 14 can vary greatly, without any effect on its function or operation. However, the depth or thickness of the light-collector means 16 is a critical dimension, since the light diffusion properties of the light-collector means 14 are dependent upon its thickness. It has been found that a light-collector means 14 having a thickness of between about $\frac{1}{4}$ inch to about four inches yields the best results. More specifically, as the thickness of the light-collector means 14 increases, thereby increasing the length of the light-collector channels 16 extending therethrough, the amount of light diffusion which occurs as light rays emitted from a defined color image pass through the light-collector channels 16 will also increase. When constructing the optical filter display device of the present invention, the light diffusion properties and, thus, the thickness of light-collector means 14 must be considered along with the light diffusion properties of display screen 12. It has been found that when the display screen 12 is constructed of a material which is only mildly light diffusing (such as for example, a laminate of a clear plastic and tracing paper) light-collector means 14 must be relatively thick (between 1 and 4 inches) so as to be able to diffuse the incoming defined color images. Conversely, a highly diffusing display screen 12, such as for example, a display screen constructed of translucent polycarbonate will permit the use of a relatively thin (between $\frac{1}{4}$ and 1 inch) light-collector means 14. It is very important, however, that the combination of display screen 12 and light-collector means 14 be sufficiently light diffusing so as to transform colored light emitted from a defined color image into a diffused composite color abstract as it passes through optical filter 10, which comprises a diffused color composite of the intercepted color image for each of the collector channels 16.

In operation, optical filter 10 is preferably placed in a position to intercept defined color images from a source or a screen, which projects colored images. Such light sources include, for example, television sets, video tape players, video disc playback units, slide projectors and motion picture projectors. While the optical filter of the present invention is preferably used with a projected light source, it can be used with a non-projected light source as will be described in greater detail hereinafter.

As presently preferred and as shown in FIGS. 1 and 2, a television set is utilized as the source of the defined color images. As illustrated, optical filter 10 is disposed so that light-collector channels 16 are in confronting relation with the screen 28 of television set 30 so as to intercept defined color images, which are displayed and projected by screen 28. The optical filter 10 can either be rested against the television set 30 and thereby supported by the set or be attached to the television set 30 by any suitable means known in the art. For example, optical filter 10 can be secured to the television set 30 by means of an adhesive or it can be secured to the television set 30 by means of clamps, such as cups, etc.

When light-collector means 14 is positioned, as shown in FIGS. 1 and 2, each light collector channel 16 intercepts at least a portion of the light rays emitted by a defined color image, which is displayed and projected by television screen 28. The light rays emitted from the defined color image enter the input ends 24 of the individual light-collector channels 16. The entering colored light rays are diffused and averaged as they pass through the individual light-collector channels 16 between input ends 24 and output ends 23. The diffused and averaged light rays exit the output ends 23 of the light-collector channels 16 and impinge upon rear surface 20 of display screen 12. The display screen 12 further diffuses the exiting diffused light rays so as to produce a plurality of composite color abstracts corresponding to the plurality of light-collector channels 16 in light collector means 14.

An example of the transformation which occurs as colored light emitted from a defined color image passes through optical filter 10 is illustrated in FIG. 16, which shows an exploded view of an individual light-collector channel 16 disposed to intercept a portion of a color image displayed on the television screen 28. Thus, as shown, light-collector channel 16 is disposed so as to intercept red and blue colored light rays emitted from a portion of a defined color image represented by the dotted line 45. As the blue and red light rays pass through light-collector channel 16 between input end 24 and output end 23, they are diffused and averaged. The exiting diffused and averaged red and blue light rays are then further diffused and averaged by display screen 12 so as to produce a violet composite color abstract on front surface 13 of display screen 12, which results from the mixing of the red and blue light. It will be apparent that when the defined color image contains a variety of different colors each of the individual light-collector channels 16 will sample a different portion of the defined color image and thus different combinations of color. This will result in a plurality of different and unique composite color abstracts being displayed on display screen 12. Moreover, when, as with a television screen, a moving color image is projected, the composite color abstracts on display screen 12 will continuously change.

The homogeneity of the colors displayed on display screen 12 will vary depending on the diameter of light collector channels 16, the diffusing property of light-collector means 14 and display screen 12. For example, as the diameter of the light-collector channels decrease the color homogeneity will increase.

While the optimum viewing distance will vary depending upon the size of the optical filter 10 and, thus, the size of the television set 30, it has been found that a viewing distance of about 8 to 10 feet for a 19-inch television set and a 16 inch by 20 inch optical filter produces the best results.

When optical filter 10 is utilized with a television set, as shown in FIGS. 1 and 2, it may be utilized with either synchronized sound, such as for example, a television picture and audio, or utilized with non-synchronized sound, such as a stereo or radio. Due to the fact that all music is based on time, tempo and base, and all visual movement is also based on time, tempo and base, synchronization will occur between what would otherwise seem to be dissimilar audio and visual sources. For example, a tennis match with its more or less repetitive visual movement on the screen, when filtered to an unrecognizable abstract pattern, will often match (synchronize) with a sound of a repetitive nature such as a metronome, or a piece of music in which the beat is regular and constant. The numerous points of audible and visible synchronization is both surprising and pleasing.

As a background piece of colored art (silent with the sound of the television receiver down or off), the filter provides a constantly moving piece of modern art. Even a badly adjusted color set, one in which none of the colors is set at an optimum, will produce literally breathtaking colors when viewed through the optical filter of the present invention.

When optical filter 10 is not used with a projected light source or screen, it may be hung in a window to catch the natural changing, moving shadows during the day, which are cast by leaves from trees, bushes, or the changing light and shade produced by passing cars and pedestrians. When used in this manner, a sheet of colored gel material may be affixed to the input side of the optical filter 10, thereby providing an additional source of colored light. Alternatively, small pieces of colored transparent cellophane may be inserted into at least some of the light-collector channels 16 in light-collector means 14, thereby creating random or specific color patterns, which are then transformed by the filter into a smoothed out color display on display screen 12.

FIG. 11 illustrates an alternative embodiment of the optical filter of the present invention wherein an input screen 18 is fixedly secured to rear surface 16 of light-collector means 14. As previously described in connection with display screen 12, input screen 18 can be fixedly secured to light-collector means 14 by one of numerous well known methods. The input screen 18 is constructed of the same translucent light diffusing materials as display screen 12. It will be apparent that since the input screen 18 and display screen 12 are manufactured of substantially the same translucent light diffusing material, in operation, the optical filter can be reversed, thereby making input screen 18 function as the display screen and making display screen 12 function as the input screen.

FIG. 12 illustrates still another embodiment of the present invention, wherein display screen 12 is spaced from light-collector means 14. Generally, such spacing is of from about 1/16th of an inch to about ½ inch, however, a spacing of from about 1/16th inch to about ¼ inch is preferred. While any means of spacing display screen 12 from light-collector means 14 can be employed, as shown in FIG. 12, it is presently preferred to utilize a spacer member 22, which can be either separately secured to either display screen 12 or light-collector means 14 or formed as an integral part of either the display screen 12 or the light-collector means 14. When the display screen 12 is spaced in this manner each color abstract being displayed appears as a light, soft pastel rather than as a bright, sharp color.

FIGS. 4-8 illustrate still other alternative embodiments of the present invention. Thus, FIG. 4 illustrates optical filter 10, wherein light-collector means 14 is perforated to provide a plurality of large and small circular light-collector channels 16 arranged in a regular pattern. FIG. 5 illustrates optical filter 10, wherein light-collector means 14 is perforated to provide a plurality of large and small circular light-collector channels 16 arranged in a regular pattern. FIG. 6 shows optical filter 10, wherein light-collector means 14 is perforated to provide a plurality of diamond shaped light-collector channels arranged in a regular pattern. FIG. 7 illustrates optical filter 10, wherein light-collector means 14 is perforated to provide a plurality of hexangular shaped light-collector channels 16 arranged in a regular pattern. Finally, FIG. 8 illustrates optical filter 10, wherein light-collector means 14 is perforated to provide a plurality of circular and triangular shaped light-collector channels 16 arranged in an irregular pattern. While a number of arrangements for light-collector channels 16 are illustrated by way of example in FIGS. 4-8, other arrangements are within the spirit and scope of the present invention. Thus, light-collector channels 16 may be of any desired geometric shape including, but not limited to, circular, square, hexangular, rectangular, and triangular. Additionally, the light-collector channels 16 may be arranged in any desired manner including both regular and irregular patterns.

FIGS. 3A, 3B, and 3C, illustrate still a different embodiment of the present invention, wherein optical filter 10 comprises display screen 12, light-collector means 14 and input screen 16. The input screen in this embodiment is sufficiently light diffusing so that it can also function as a display screen for the color light output. As best shown in FIG. 3C, the light-collector channels 16 in the light-collector means 14 are tapered. This results in the holes on the front side 21 of light-collector means 14 having a larger diameter than the holes on the rear side 26 of the light-collector means 14. Thus, as shown in FIG. 3A, when display screen 12 faces the viewer each hole actually touches the adjacent holes. Conversely, as shown in FIG. 3B, when input screen 18 faces the viewer, the holes are much smaller and do not touch the adjacent holes. Furthermore, in accordance with this embodiment, the front surface 21 of the light-collector means 14 is a light color, such as white, whereas the rear surface 26 of said light-collector means is a dark color, such as black. Thus, as illustrated in FIG. 3B, when the smaller size openings are viewed as the output the abstract colors are displayed against a dark opaque background between each opening resulting in an enhancement of the color, which makes the color appear bright. When the screen is reversed, as shown in FIG. 3A, and the larger size openings are viewed as the output, the colors are displayed against a lighter background with the colors in each opening touching the opening next to it. This produces a higher key of illumination resulting in each color being displayed as a light, soft pastel. Thus, according to this variation both sides of the optical filter 10 produce entirely different visible displays resulting from different renditions of colors from the same input source.

While not shown, the light-collector channels 16 in light-collector 14 may be shaped so as to provide holes having one peripheral geometric shape such as, for example, hexagonal on the front side 21 of light-collector means 14 and another peripheral geometric shape, such as for example, circular on the rear side 26 of light-collector means 14. Such an optical filter 10 has both a display screen 12 and an input screen 18 and, thus, can also be used to produce two different color displays by simply reversing the way optical filter 10 faces the television screen 28.

While it is presently preferred and the light-collector means 14 is depicted in the drawings as having a solid body portion perforated with a plurality of light-collector channels 16, the light-collector means 14 can alternatively be constructed of a plurality of individual hollow tubular members secured together by means of, for example, an adhesive. Any open spaces between adjacent tubular members will not substantially affect the display result and can, if desired, be filled with either an opaque or translucent material. Like the light-collector channels 16 in light-collector means 14, the tubular members can be of any desired shape and size and be arranged in any desired manner.

In still another alternative embodiment light-collector means 14 can be constructed of individual solid rods of a translucent material, such as for example, glass, plastic, etc., which are secured together by means of, for example, an adhesive. Again, any spaces between the individual adjacent rods will not substantially affect the display result and can, if desired, be filled with either a translucent or an opaque material. The individual rods can, of course, be of any desired shape and size and can be arranged in any desired pattern.

In still a further alternative, the light-collector means 14 can be constructed of a grid-like structure comprising ribs spaced apart and extending vertically in parallel lines and ribs spaced apart and extending horizontally in parallel lines intersecting the vertical ribs at right angles so as to form right angular sections therebetween. Obviously, such a grid can be constructed of flexible ribs, which can be shifted from one position to another, thus producing a change from one geometric pattern to another such as for example, from squares to diamonds.

As shown in FIG. 13, still another variation according to the invention is illustrated. In accordance therewith, optical filter 10 compries input screen 18, light-collector means 14, display screen 12, a preferably planar and fully silvered rear mirror 32, a preferably planar partially silvered front mirror 36 which is in a spaced apart parallel relation to mirror 32, and a housing 38 for supporting the individual members in their defined relation.

According to the invention, a partially "silvered" mirror is one which will reflect a certain percentage of light while transmitting substantially all of the remainder, a small amount of absorption and other losses being unavoidable. Such a mirror may be constructed in any number of ways well known to those skilled in the art, such as by covering one side of a transparent substrate such as glass or plastic with a reflective coating of, for example, silver or aluminum. Such coatings may be applied in any well known manner, such as for example, vapor deposition. Aluminized "Mylar" is presently preferred. The relative amount of light reflected and transmitted by the mirror is dependent on the reflectivity of the coating applied to the substrate. As shown in FIG. 14, the mirror 36 is a planar piece of glass with a partially reflective coating 35 applied to its rear surface. However, the term "partially silvered" as used above is not intended to limit the mirror to one in which a transparent substrate is coated with silver, since, as noted above, any reflective coating such as, for example, aluminum, will suffice. Rather, the term is generically used to describe a mirror having the above described optical property. As presently preferred, the mirror 36 should reflect not less than 50% and not more than 95% of light incident upon it, with about 90% reflection being preferred.

A "fully silvered" mirror is one which reflects substantially all of the light incident upon it, small losses due to absorption and reflection being unavoidable. The construction of a fully silvered mirror is similar to that of a partially silvered one except that in the case of a fully silvered mirror a denser reflective coating 33 is applied and in addition, an opaque coating 34 is applied to the rear surface of the mirror. The opaque coating may be applied in any number of well known ways, such as for example, by painting the rear surface of the mirror. As shown in FIG. 14, the mirror 32 is a planar piece of glass 38 with a substantially fully reflective coating 33 and a black matte finish 34 applied to its rear surface. Moreover, opaque coating 34 on mirror 32 is provided with at least one gap 40. Since the reflective coating 33 is always partially conductive of the light directed through said gap, part will be transmitted through said reflective coating and said transparent coating and become incident upon mirror 36, causing light passing through said gap to be reflected between said mirrors. This will establish multiple virtual images of light (42A, 42B, 42C, etc. in FIG. 15), in the shape of the gap or gaps which appear to extend back into the device. The effect of these multiple virtual images is to impart an illusion of depth to the observer. If desired, and as presently preferred, there may be more than one gap and the gaps may be of any desired shape or size and may be arranged in any desired pattern either regular or irregular. Moreover, some or all of the reflective coatings in the gap may be removed to increase the amount of light from a source that passes through the gap.

As previously noted, housing 38 supports display screen 12, light-collector means 14, input screen 16, and the mirrors 32 and 36 in a generally parallel confronting relation. Numerous ways of constructing a suitable housing are obvious to one skilled in the art, and any may be used. As shown, housing means 40 include a rectangular shaped member 44 of wood, plastic, metal or other suitable material, having a substantially rectangular cross section and framing member 46 for holding said member in a generally parallel confronting relation.

In a variation of this embodiment, mirror 32 can take the place of display screen 12, which need not be used. If display screen 12 is replaced by mirror 32, input screen 16 and light-collector means 14 must be sufficiently light diffusing, as described previously.

To further enhance the aesthetic effect, it is possible for the mirrors of said optical filter to take any number of peripheral shapes, such as for example, circular or elliptical, their construction not being limited to rectangular, periphery depicted in the drawings. Preferably, however, the peripheral shapes of display screen 12, input screen 16, light-collector means 14, and mirrors 32 and 36 are substantially the same.

While I have herein shown and described the preferred embodiment of the present invention and have suggested modifications therein, other changes and modifications may be made therein within the ascope of the appended claims without departing from the sphere and scope of this invention.

What is claimed is:

1. An optical filter disposable so as to intercept a defined color image from a source and transform said defined color image into a color abstract, said defined color image emitting a plurality of light rays associated therewith, said filter comprising a light-collector means having a plurality of light-collector channels extending therethrough, a light translucent display screen having a front surface and a rear surface said display screen being composed of a translucent light diffusing material; said light-collector channels each having an input end and an output end; said display screen rear surface being disposed in confronting relation with said light-collector channels output ends, said light-collector channels input ends being disposable to intercept at least a portion of said light rays emitted from said color image, each of said light-collector channels diffusing and averaging said portion of intercepted light rays being passed therethrough from said input end to said output end for impinging said diffused and averaged portion of said intercepted light rays upon said rear surface of said display screen, said display screen further diffusing said impinging light rays for providing a diffused color abstract on said front surface comprising a diffused color composite of said intercepted color image.

2. The optical filter as defined in claim 1, wherein said light-collector means and said display screen are oriented in parallel planes.

3. The optical filter as defined in claim 2, wherein said light-collector means is in abutting relation with said display screen.

4. The optical filter as defined in claim 2 further comprising: a means for spacing said display screen from said light-collector means, whereby said display screen is spaced apart a sufficient distance from said light-collector means so as to cause said diffused color abstract to appear to be a soft, pastel color.

5. The optical filter as defined in claim 1, wherein said light-collector means comprises a solid opaque body.

6. The optical filter as defined in claim 5, wherein at least a portion of said plurality of light-collector channels are plugged with transparent material.

7. The optical filter as defined in claim 6, wherein said transparent material is colored.

8. The optical filter as defined in claim 5 wherein said light-collector channels are circular.

9. The optical filter as defined in claim 5, wherein each of said plurality of light-collector channels is conically tapered so as to define light-collector channel having a first diameter at said input end thereof and a second diameter at said output end thereof.

10. The optical filter as defined in claim 1, wherein said light-collector means comprises a plurality of individual light-collector members.

11. The optical filter as defined in claim 10, wherein said individual light-collector members are affixedly secured to each other.

12. The optical filter as defined in either claims 10 or 11, wherein said individual light-collector members are solid translucent rods.

13. The optical filter as defined in claim 10, wherein said individual light-collector members comprise hollow tubular members having opaque side walls.

14. The optical filter as defined in claim 10, wherein said individual light-collector members comprise hollow tubular members having translucent side walls.

15. The optical filter as defined in claim 1 wherein said display screen has a thickness sufficient to diffuse said defined color image, whereby as the thickness of said light-collector means increases the amount of light diffusion which occurs as said light rays emitted from said defined color image pass through said one light-collector channel also increases.

16. The optical filter as defined in claim 1 wherein said display screen has a translucent polycarbonate type light diffusion property.

17. The optical filter as defined in claim 1, further comprising: an input screen, said input screen being in a confronting relation with said light-collector means input end.

18. The optical filter as defined in claim 1, further comprising: a fully silvered rear mirror having a front surface and a rear surface and having at least one light transmitting gap, said rear mirror being in confronting relation with said front surface of said display screen; a partially silvered front mirror having a front surface and a rear surface and disposed in parallel relation with said rear mirror; a means for spacing said rear mirror from said front mirror a distance sufficient to allow any light passing through said light transmitting gap in said rear mirror to be reflected between said rear mirror and said front mirror, whereby at least a portion of said composite color abstract displayed on said display screen is transmitted through said light transmitting gap and reflected back and forth between said front and rear mirror for creating an illusion of depth when viewed through said front mirror.

19. The optical filter as defined in claim 5, wherein said light collector means has a plurality of large and small circular light collector channels arranged in a regular pattern.

20. The optical filter as defined in claim 5, wherein said light collector means has a plurality of large and small circular light collector channels arranged in an irregular pattern.

21. The optical filter as defined in claim 5, wherein said light collector means has a plurality of diamond shaped light collector channels arranged in a regular pattern.

22. The optical filter as defined in claim 5, wherein said light collector means has a plurality of hexagonal shaped light collector channels arranged in a regular pattern.

23. The optical filter as defined in claim 5, wherein said light collector means has a plurality of circular and triangular shaped light collector channels arranged in an irregular pattern.

* * * * *